United States Patent [19]

Morita

[11] 4,217,927
[45] Aug. 19, 1980

[54] RELIEF AND MAKE-UP VALVE ASSEMBLY

[75] Inventor: Izuru Morita, Sagamihara, Japan

[73] Assignee: Caterpillar Mitsubishi Ltd., Tokyo, Japan

[21] Appl. No.: 916,458

[22] Filed: Jun. 16, 1978

[30] Foreign Application Priority Data

Jun. 24, 1977 [JP] Japan ................................ 52-74449

[51] Int. Cl.³ ......................................... F16K 17/196
[52] U.S. Cl. .............................. 137/493.3; 137/454.5
[58] Field of Search ..................... 91/441, 451, 468; 137/493, 493.3, 493.4, 493.5, 493.6, 454.5

[56] References Cited

U.S. PATENT DOCUMENTS

| 2,979,077 | 4/1961 | Swenson | 137/493.6 X |
| 3,100,503 | 8/1963 | Tennis | 137/491 |
| 3,112,763 | 12/1963 | Tennis et al. | 137/493.5 |
| 3,153,423 | 10/1964 | Biello et al. | 137/493.5 |
| 3,856,041 | 12/1974 | Cryder et al. | 137/493.6 |
| 4,016,903 | 4/1977 | Akashi | 137/493.6 X |

Primary Examiner—Robert G. Nilson
Attorney, Agent, or Firm—Charles E. Lanchantin, Jr.

[57] ABSTRACT

A relief and make-up valve assembly connects first and second passages in a fluid pressure device and includes a hollow housing having an outer valve seat communicating with the first and second passages, an outer valve member for relieving fluid from the first passage to the second passage in response to a preselected high pressure in the first passage, the outer valve member having an inner valve seat, an inner valve member for relieving fluid from the second passage to the first passage in response to a pressure in the second passage above that in the first passage, a first spring for resiliently urging the outer valve member against the outer valve seat, and a second spring for resiliently urging the inner valve member against the inner valve seat.

8 Claims, 3 Drawing Figures

RELIEF AND MAKE-UP VALVE ASSEMBLY

FIELD OF THE INVENTION

This invention relates to a relief and make-up valve assembly, and more particularly to a dual function valve assembly provided in a fluid pressure device having first and second passages, such that when a preselected high pressure occurs in the first passage then the first passage is brought into open communication with the second passage so as to allow a fluid to flow from the former to the latter, thereby relieving the pressure therefrom, and when the pressure in the first passage becomes lower than that in the second passage, then the second passage is brought into open communication with the first passage, thereby supplying a fluid from the former to the latter to make up or supplement the pressure level in the first passage.

DESCRIPTION OF THE PRIOR ART

A valve assembly is known in which, as disclosed in Japanese Patent Publication No. Sho 38-13336, issued to F. H. Tennis and published July 26, 1963, a pilot-operated relief valve and a make-up valve are combined with each other. However, valve assemblies of this type suffer several disadvantages. Firstly, they are extremely complex and their manufacturing cost is high. Secondly, there is a problem of a spring causing binding to a sliding member due to the streams of fluid acting thereon and an inner poppet failing to be properly seated upon restoring a pressure in a high pressure fluid passage to a normal level. Thirdly, since the relief valve built therein is of the pilot-operated type, there is a lag in response upon relieving an excessively high pressure therefrom. Fourthly, since the spring urging the outer poppet valve body against its valve seat for fluid make-up is commonly used for biasing an inner poppet valve body against its valve seat, limitations are imposed on the construction parameters of the spring, thus leading to an undesirable response to a lowered pressure during a make-up operation.

Another valve assembly is known in which, as disclosed in Japanese Patent Publication No. Sho 39-26248 issued to F. H. Tennis et al and published Nov. 18, 1964, a direct-acting type relief valve and a make-up valve are combined with each other. However, such valve assembly is also undesirable because the make-up portion includes an outer low pressure poppet, and the high pressure relief portion includes an inner high pressure poppet disposed within the outer poppet. Moreover, the available space for the spring that biases the high pressure relief portion against its valve seat is too small in comparison with the size of the entire valve assembly. Because of these problems, the referenced valve assembly has to be increased in size, or a costly spring utilized in order to obtain the desired high relief pressure. These factors result in high cost and manufacturing difficulties. Still another factor with an inner high pressure poppet valve resides in the fact that the valve-seat opening therefor is too small relative to the size of the entire valve assembly, so that its overall pressure-relieving capacity is also limited.

SUMMARY OF THE INVENTION

It is an object of the present invention to provide an effective relief and make-up valve assembly which is directed to overcoming one or more of the problems as set forth above, and which is simple in construction and relatively low in cost.

A relief and make-up valve assembly connects first and second passages in a fluid pressure device and includes a hollow housing having an outer valve seat communicating with the first and second passages, an outer valve member for relieving fluid from the first passage to the second passage in response to a preselected high pressure in the first passage, the outer valve member having an inner valve seat, an inner valve member for relieving fluid from the second passage to the first passage in response to a pressure in the second passage above the first passage, a first spring for resiliently urging the outer valve member against the outer valve seat, and a second spring for resiliently urging the inner valve member against the inner valve seat.

In contrast to the relief and make-up valve assembly disclosed in previously noted Japanese Patent Publication No. Sho 39-26248, the valve assembly of the present invention utilizes an outer poppet valve for high pressure relief valve and an inner poppet valve for make-up purposes. Advantageously, the inner poppet valve is disposed within the outer poppet valve, and a relatively large space is thus provided for receiving a spring for exerting a biasing force on the outer poppet valve so as to urge it against its valve seat. This permits convenient establishment of the high pressure relief valve setting in a compact manner. Furthermore, the valve-seat opening for the outer poppet valve can be of relatively large size to afford the desired pressure-relieving capacity.

DETAILED DESCRIPTION

Figure 1:
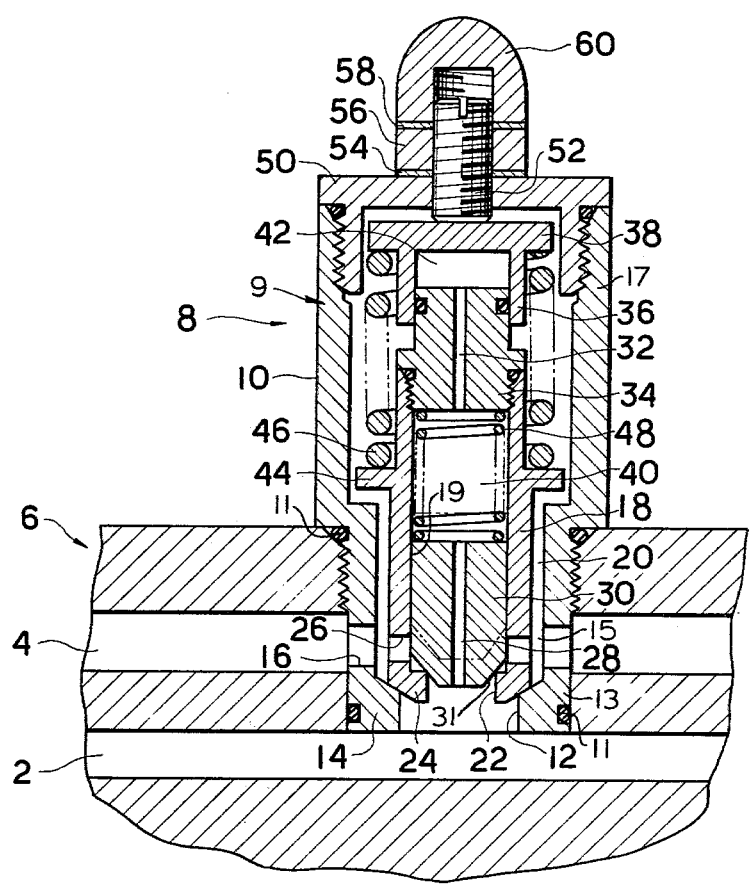
FIG. 1 is a longitudinal cross-sectional view of a first embodiment of the present invention.

As shown in FIG. 1, a first or high pressure passage 2 and a second or low pressure passage 4 are defined in a fluid pressure device 6. A relief and make-up valve assembly 8 is operatively associated with these passages and includes housing means 9. In the instant example, the housing means 9 includes a housing 10 of generally hollow cylindrical form which is screw threadably received in the fluid pressure device 6. Conventional annular seal rings 11 are provided to prevent undesirable leakage therebetween.

A center through-hole 12 having a preselected diameter is defined in an axially inner end or front portion 13 of the valve housing 10, and a first or outer poppet valve seat 14 is also defined thereat. Preferably, two or more third passages or side-openings 16 are disposed at a preselected axial location along the circumference of the housing 10 intermediate the inner end 13 and an axially outer end or rear portion 17. The through-hole 12 provided in the outer poppet valve seat 14 faces the high pressure passage 2 so as to bring an interior portion 15 of the valve housing into communication therewith, and the side-openings 16 face the low pressure drain passage 4 so as to similarly bring the interior portion 15 into communication therewith. In addition, the rear portion 17 of the housing is closed as will be later described.

An outer poppet valve 18 is axially slidingly received in the housing 10, and has a bore 19 defined therein. An annular passage 20 is defined between the outer peripheral surface of the outer poppet valve 18 and the housing and is in communication with the low pressure drain passage 4 via the side-openings 16.

A second or inner poppet valve seat 24 is formed on the front end, or lower end when viewing FIG. 1, of the outer poppet valve 18, and seats against the outer poppet valve seat 14. A center through-hole 22 of a preselected diameter is defined in the inner poppet valve seat 24, and two or more fourth passages or side-openings 26 are defined through the outer poppet valve 18 in axial and radial alignment with the side-openings 16 when the outer poppet valve is seated against the outer poppet valve seat 14. With such arrangement, the interior of the outer poppet valve 18 communicates with the high pressure passage 2 via the through-holes 12 and 22, and communicates with the low pressure drain passage 4 via the side-openings 16 and 26. In addition, the rear end portion of the outer poppet valve 18 is closed as will be later described.

An inner poppet valve 30 having a center through-hole 28 is axially slidingly and sealingly fitted in the bore 19 of the outer poppet valve 18. In this way, a cylindrical front surface 31 of the inner poppet valve 30 can be seated against the inner poppet valve seat 24.

In the embodiment shown in FIG. 1, an adapter member 34 having a center through-hole 32 is screw threadably connected to the outer poppet valve 18. A hollow cylindrical extension 36 projects axially from a spring seat 38 and slidingly and sealingly fits over the adapter member or, in effect, the rear portion of the outer poppet valve. With such construction, a first chamber 40 is defined within the outer poppet valve 18 between the inner poppet valve 30 and the adapter member 34. This chamber communicates with the high pressure passage 2 via the through-hole 28. In addition, a second chamber 42 is defined between the adapter member 34, the cylindrical extrusion 36, and the spring seat 38. This second chamber 42 communicates with the first chamber 40, and hence with the high-pressure passage, via the through-hole 32, and provides a common reaction chamber.

An annular shoulder portion 44 projects radially from the outer poppet valve 18, and is so arranged that a relatively strong first spring 46 can be confined between the annular shoulder portion 44 and the spring seat 38. In this way, the first spring 46 continually biases the outer poppet valve 18 toward the outer poppet valve seat 14 or downwardly when viewing FIG. 1. In addition, a relatively weak second spring 48 is confined between the adapter member 34 and the inner poppet valve 30 so as to bias the inner poppet valve 30 toward the inner poppet valve seat 24, or downwardly when viewing FIG. 1.

A plug member 50 is screw threadably and sealingly received in the housing 10 and an adjusting screw 52 extends through the plug member 50 so as to abut the spring seat 38. Accordingly, when the adjusting screw 52 is rotated so as to increase the length thereof projecting internally of the housing 10, then the spring seat 38 is moved forwardly or downwardly when viewing FIG. 1 so that the loading of the first spring 46 against the outer poppet valve 18 is increased. Conversely, when the adjusting screw 52 is rotated on the opposite direction, the force provided by the first spring 46 against the outer poppet valve is reduced. The adjusting screw receives in serial relation a seal washer 54, a lock nut 56, a seal washer 58, and a cap nut 60, so that the rear end of the housing 10 is sealingly closed.

In operation of the aforementioned relief and make-up valve assembly 8, pressure in the high pressure passage 2 acts directly on the front end of the inner poppet valve 30, while a similar pressure acts on the rear end of the inner poppet valve because the through-hole 28 communicates with the first chamber 40. However, the effective pressure-bearing area at the front end of the inner poppet valve 30 as defined by the through-hole 22 is less than the effective pressure-bearing area at the rear end of the inner poppet valve as defined by the bore 19. As a result of the pressure in passage 2, the inner poppet valve 30 is continually urged against the inner poppet valve seat 24. In addition, the relatively weak second spring 48 biases the inner poppet valve 30 against the inner poppet valve seat. Accordingly, under these conditions, the inner poppet valve maintains the through-hole 22 in its closed position.

However, the pressure in the first chamber 40 is also present in the second chamber 42 so that the outer poppet valve 18 is simultaneously biased against the outer poppet valve seat 14. Moreover, the relatively strong first spring 46 acts in the same direction thereon. In addition, since the front end of the outer poppet valve 18 is exposed to the pressure in passage 2 via the center through-hole 12, the effective pressure bearing area at the front end of the outer poppet valve is larger than that at the rear so that a resultant force can urge the outer poppet valve rearwardly away from the outer poppet valve seat 14. Accordingly, when the pressure in the passage 2 remains below a preselected pressure setting as established by the force of the first spring 46, then the poppet valve 18 is seated on the outer poppet valve seat 14, thereby maintaining the through-hole 12 closed and the passages 2 and 4 out of communication with each other.

When the pressure in passage 2 exceeds the preselected pressure setting or relief pressure, then the outer poppet valve 18 moves upwardly when viewing FIG. 1 against the action of the spring 46 and away from the outer poppet valve seat 14. As a result, the passages 2 and 4 are brought into open communication with each other via the relatively large through-hole 12 and the side-openings 16, so that the high pressure in the passage 2 is relieved into the passage 4.

On the other hand, when the pressure in the passage 2 is at a vacuum level, then the relatively higher pressure existing in the low pressure passage 4 acts on the inner poppet valve due to the difference in effective pressure-bearing area between the front end and the rear end of the inner poppet valve 30 so as to move it away from the inner poppet valve seat 24. In such instance, the pressure in passage 4 overcomes the force of the relatively weak second spring 48 so that the through-hole 22 is opened. Accordingly, passages 2 and 4 are in open communication so that fluid is supplied from the passage 4 to the passage 2. It is to be understood that the pressure in the passage 4 is maintained at a level equal to or somewhat higher than atmospheric pressure for fluid make-up purposes. In general, such fluid make-up should be quickly accomplished, so that the force of the second spring 48 acting on the inner poppet valve 30 should preferably be relatively weak.

The second and third embodiments of the relief and make-up valve assemblies of the present invention will now be described with reference to FIGS. 2 and 3. In this regard, the reference numerals shown in FIGS. 2 and 3 for like parts corresponding to those in FIG. 1 are given like reference numerals only with 100 and 200 added thereto.

Figure 2:
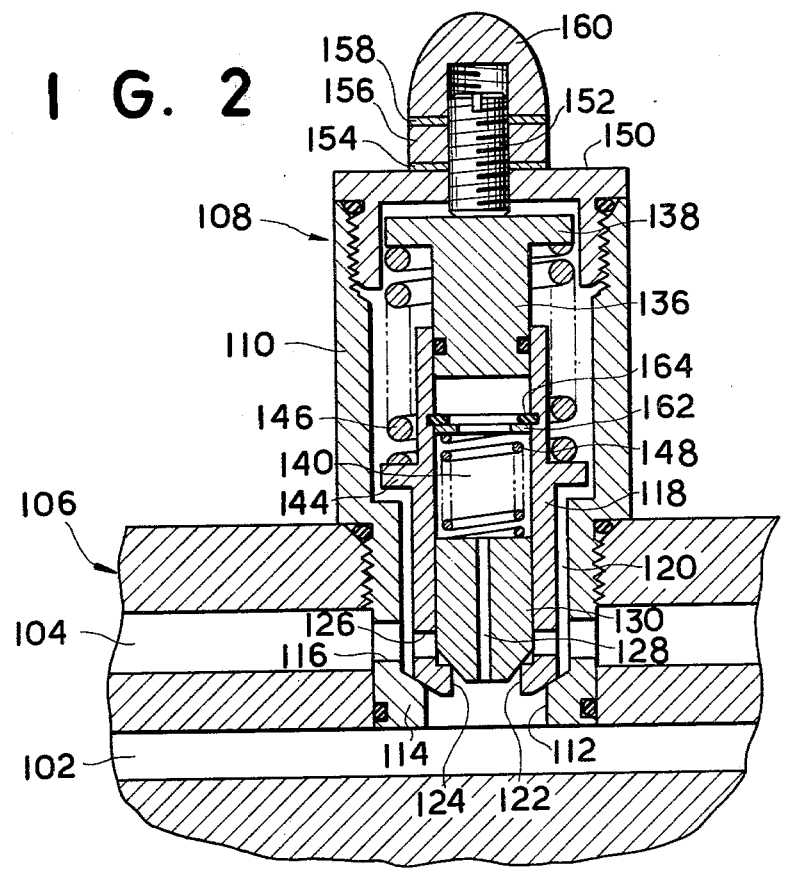
FIG. 2 is a longitudinal cross-sectional view of a second embodiment of the present invention.

As illustrated in FIG. 2, a relief and make-up valve assembly 108 differs from the valve assembly 8 of FIG. 1 in the following manner. Firstly, the valve assembly 108 dispenses with the adapter member 34 used in valve assembly 8, and has the rear end of an outer poppet valve 118 sealingly closed solely with a spring seat 138. In other words, a cylindrical extension 136 of the spring seat 138 is of a solid columnar form, rather than being of a hollow tubular form. Moreover, the extension 136 is slidingly and sealingly fitted within the rear portion of the outer poppet valve 118 and defines a single reaction chamber 140 therein. Secondly, a washer 162 and a ring 164 are located in a preselected axial position internally of the outer poppet valve 118 for supporting the rear portion of the second spring 148, whereas in FIG. 1 the front end of the adapter member 34 serves such function. However, the washer 162 and the ring 164 can be omitted, and the rear end of the second spring 148 permitted to engage extension 136. In the latter case, the second spring 148 is confined between the inner poppet valve 130 and the spring seat 138. Accordingly, when the adjusting screw 152 is turned so as to change a force of the first spring 146 acting on the outer poppet valve 118, then the force of the second spring 148 acting on the inner poppet valve 130 is modified. However, the force of the relatively weak second spring 148 is varied to only a limited degree, so that the desired make-up function is not sacrificed. The other operational features remain substantially the same as those of the valve assembly 8.

Figure 3:
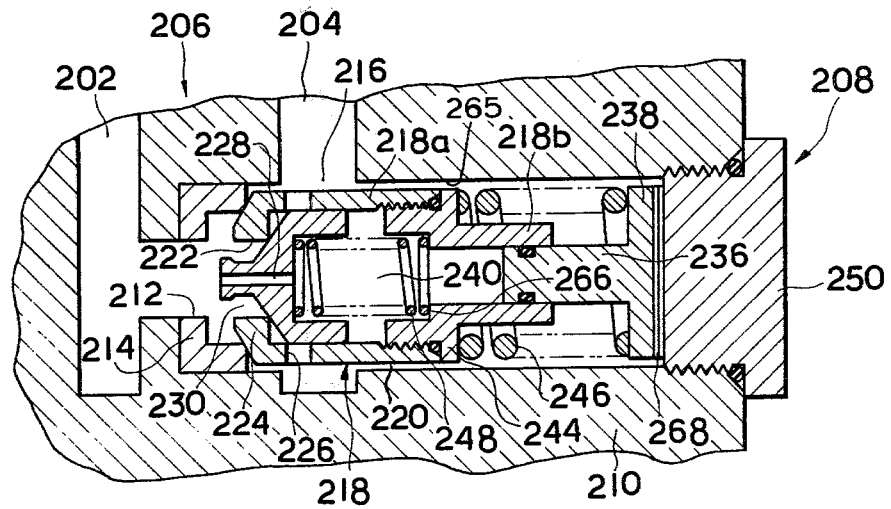
FIG. 3 is a longitudinal cross-sectional view of a third embodiment of the present invention.

Referring now to FIG. 3, a relief and make-up valve assembly 208 differs from the embodiment shown in FIG. 2 in the following areas. Firstly, a housing 210 is formed integrally with a fluid pressure device 206 and provides a suitable bore 265 for receiving the valve assembly 208 therein. Preferably, a separate outer poppet valve seat 214 is securely positioned in the front end of the bore such as by press-fitting or the like. Secondly, an outer poppet valve 218 consists of two members 218a, 218b which are screw threadably and sealingly engaged together. In addition, a shoulder portion 266 on the rear member 218b serves as a seat for the second spring 248, in place of the washer 162 and the ring 164 provided in FIG. 2. Thirdly, there are omitted the adjusting screws 52,152, seat washers 54,154, lock nuts 56,156, seal washers 58,158, and cap nuts 60,160 which are provided in the embodiments shown in FIGS. 1 and 2. Rather, a sealed and threaded plug member 250 of solid form is provided and one or more shim members 268 serve for adjusting the axial position of the spring seat 238. The thickness and number of the shim members determine the biasing force of the first spring 246 acting on the outer poppet valve 218, and hence serve to establish the desired relief pressure. The operational features of the valve assembly 208 otherwise remain substantially the same as those of the valve assemblies 8 and 108.

Other aspects, objects, and advantages of this invention can be obtained from a study of the drawings, the disclosure, and the appended claims.

What is claimed is:

1. A relief and make-up valve assembly (8) connecting first and second passages (2,4) in a fluid pressure device (6), the valve assembly comprising:
   a hollow housing (10) having an outer valve seat (14) communicating with the first and second passages (2,4);
   outer valve member means (18) for relieving fluid from the first passage (2) to the second passage (4) in response to a preselected high pressure in the first passage (2), the outer valve member means (18) having an inner valve seat (24);
   inner valve member means (30) for relieving fluid from the second passage (4) to the first passage (2) in response to a pressure in the second passage (4) above the first passage (2), the inner valve member means (30) having a through-hole (28);
   a reaction chamber (40) in continual communication with the first passage (2) through the through-hole (28) in the inner valve member means (30), the outer valve member means (18) being urged toward the outer valve seat (14) in response to the pressure in the reaction chamber (40);
   first spring means (46) for resiliently urging the outer valve member means (18) against the outer valve seat (14); and
   second spring means (48) for resiliently urging the inner valve member means (30) against the inner valve seat (24).

2. The valve assembly (8) of claim 1 including a stationary cylindrical member (36) and wherein the reaction chamber (40) is defined by the outer and inner valve member means (18,30) and the stationary cylindrical member (36).

3. The valve assembly (8) of claim 2 wherein the stationary cylindrical member (36) is of a construction sufficient for axially slidingly and sealingly receiving the outer valve member means (30).

4. A relief and make-up valve assembly (8) connecting first and second passages (2,4) in a fluid pressure device (6), the valve assembly comprising:
   a hollow housing (10) having a hollow cylindrical extension (36) and an outer valve seat (14) communicating with the first and second passages (2,4);
   outer valve member means (18) for relieving fluid from the first passage (2) to the second passage (4) in response to a preselected high pressure in the first passage (2), the outer valve member means (18) having an inner valve seat (24) and being slidingly received in the extension (36) completely within the housing (10);
   inner valve member means (30) for relieving fluid from the second passage (40 to the first passage (2) in response to a pressure in the second passage (4) above the first passage (2), the inner valve member means (30) having a through-hole (28);
   a reaction chamber (40) in continual communication with the first passage (2) through the through-hole (28) in the inner valve member means (30);
   first spring means (46) for resiliently urging the outer valve member means (18) against the outer valve seat (14); and
   second spring means (48) for resiliently urging the inner valve member means (30) against the inner valve seat (24).

5. A relief and make-up valve assembly (8) connecting first and second passages (2,4) in a fluid pressure device (6), the valve assembly comprising:
   a hollow housing (10) having a cylindrical extension (136,236) and an outer valve seat (14) communicating with the first and second passages (2,4);

outer valve member means (18) for relieving fluid from the first passage (2) to the second passage (4) in response to a preselected high pressure in the first passage (2), the outer valve member means (118,218) having an inner valve seat (24) and being slidingly received on the extension (136,236);

inner valve member means (30) for relieving fluid from the second passage (4) to the first passage (2) in response to a pressure in the second passage (4) above the first passage (2), the inner valve member means (30) having a through-hole (28), the outer valve member means (18) defining with the extension (136,236) and the inner valve member means (30) a reaction chamber (40) in continual communication with the first passage (2) through the through-hole (28);

first spring means (46) for resiliently urging the outer valve member means (18) against the outer valve seat (14); and second spring means (48) for resiliently urging the inner valve member means (30) against the inner valve seat (24).

6. A relief and make-up valve assembly (8) connecting first and second passages (2,4) in a fluid pressure device (6), the fluid pressure device defining an outer valve seat (14), the valve assembly comprising:

first and second springs (46,48);

an outer poppet valve (18) having an inner valve seat (24) and being of a construction sufficient for relieving fluid from the first passage (2) to the second passage (4) in response to a preselected pressure in the first passage (2), the outer poppet valve (18) being urged against the outer valve seat (14) by the first spring (46);

an inner poppet valve (30) having a through-hole (28) and being of a construction sufficient for relieving fluid from the second passage (4) to the first passage (2) in response to a pressure in the second passage (4) above the first passage (2), the inner poppet valve (30) being urged against the inner valve seat (24) by the second spring (48);

a stationary member (36); and a reaction chamber (40) defined by the outer and inner poppet valves (18,30) and the stationary member (36) in continual communication with the first passage (2) through the through-hole (28) in the inner poppet valve (30).

7. A relief and make-up valve assembly (8) connecting first and second passages (2,4) in a fluid pressure device (6), the fluid pressure device defining an outer valve seat (14), the valve assembly comprising:

first and second springs (46,48);

an outer poppet valve (18) having an inner valve seat (24) and being of a construction sufficient for relieving fluid from the first passage (2) to the second passage (4) in response to a preselected pressure in the first passage (2), the outer poppet valve (18) being urged against the outer valve seat (14) by the first spring (46);

an inner poppet valve (30) having a through-hole (28) and being of a construction sufficient for relieving fluid from the second passage (4) to the first passage (2) in response to a pressure in the second passage (4) above the first passage (2);

a member (36); and a reaction chamber (40) defined by the outer and inner poppet valves (18,30) and the member (36), the reaction chamber (40) being in continual communication with the first passage (2) through the through-hole (28) in the inner poppet valve (30), and wherein the member (36) is hollow and adapted to slidingly receive a portion of the outer poppet valve (18) therein.

8. A relief and make-up valve assembly (8) connecting first and second passages (2,4) in a fluid pressure device (6), the fluid pressure device defining an outer valve seat (14), the valve assembly comprising:

first and second springs (46,48);

an outer poppet valve (18) having an inner valve seat (24) and being of a construction sufficient for relieving fluid from the first passage (2) to the second passage (4) in response to a preselected pressure in the first passage (2), the outer poppet valve (18) being urged against the outer valve seat (14) by the first spring (46);

an inner poppet valve (30) having a through-hole (28) and being of a construction sufficient for relieving fluid from the second passage (4) to the first passage (2) in response to a pressure in the second passage (4) above the first passage (2);

a member (36); and a reaction chamber (40) defined by the outer and inner poppet valves (18,30) and the member (36), the reaction chamber (40) being in continual communication with the first passage (2) through the through-hole (28) in the inner poppet valve (30), and wherein the member (36) is of a construction sufficient for slidingly and sealingly extending into the outer poppet valve (18).

* * * * *